United States Patent [19]
Rilling et al.

[11] Patent Number: 5,271,269
[45] Date of Patent: Dec. 21, 1993

[54] ROTARY POSITION TRANSDUCER

[75] Inventors: Heinz Rilling, Eberdingen; Armin Witzig, Renningen, both of Fed. Rep. of Germany

[73] Assignee: Robert Bosch GmbH, Stuttgart, Fed. Rep. of Germany

[21] Appl. No.: 723,036

[22] Filed: Jun. 28, 1991

[30] Foreign Application Priority Data

Sep. 12, 1990 [DE] Fed. Rep. of Germany ....... 4028931

[51] Int. Cl.⁵ ............................................. G01M 19/00
[52] U.S. Cl. ...................................... 73/118.1; 338/98
[58] Field of Search ................. 73/118.1; 338/98, 315, 338/67, 166, 202; 464/101

[56] References Cited

U.S. PATENT DOCUMENTS

| | | | |
|---|---|---|---|
| 3,031,866 | 5/1962 | Johnson | 464/101 |
| 3,363,068 | 1/1968 | Schwab | 200/11 D |
| 4,688,420 | 8/1987 | Minagawa | 73/118.1 |

FOREIGN PATENT DOCUMENTS 2111262 9/1977 Fed. Rep. of Germany.

*Primary Examiner*—Jerry W. Myracle
*Attorney, Agent, or Firm*—Edwin E. Greigg; Ronald E. Greigg

[57] ABSTRACT

A rotary position transducer for generating electrical rotary angle signals as a function of the pivoted position of a rotary device, in particular a throttle valve in the fuel supply system of an internal combustion engine, has a first carrier with concentrically disposed electric contact tracks and a second carrier with fixedly disposed wipers, which rest with axial pressure on the contact tracks. One of the two carriers is rotatable relative to the other, and the rotatable carrier has a securing element for coupling of the rotary device in a manner fixed against relative rotation. To suppress a transmission of radial and axial play of the rotary device to the arrangement of wipers and contact tracks, the securing element is joined to the carrier via a spring coupling that is torsionally rigid in the rotational direction but highly elastic in the axial and radial direction.

19 Claims, 5 Drawing Sheets

ROTARY POSITION TRANSDUCER

BACKGROUND OF THE INVENTION

The invention is based on a rotary position transducer for generating electrical rotational angle signals as a function of the swiveled position of a rotating device, in particular a throttle valve in a fuel supply system of an internal combustion engine.

A known rotary position transducer of this type (German Patent 21 11 262), a so-called acceleration signal transducer, serves to affect the control electronics in a fuel injection system, so that fast acceleration from low rpm is possible. In this acceleration signal transducer, two concentric contact tracks are disposed, insulated from one another, on a printed circuit board that is secured to the stationary carrier embodied as a metal base plate. The two contact tracks are provided with radial transverse ribs with teeth facing one another. A wiper secured to a wiper plate seated rotatably on a bush retained in the base plate cooperates with the two contact tracks. The wiper plate has a radially protruding support arm with two stop bolts disposed side by side spaced apart from one another in the direction of rotation. One stop bolt carries the wiper on the underside of the wiper plate; the wiper rests on the contact tracks with axial biasing. The wiper plate and thus the wiper is rotated by a coupler, which protrudes through the bush in the base plate and has a receptacle for inserting the end of the throttle valve shaft, which is held in it in a positively engaged manner. The coupler has a radially protruding coupler fork, which carries with it, in both directions of rotation, an indexing arm pivotably seated on the support arm of the wiper plate; this arm in turn protrudes between the stop bolts on the support arm. Upon rotation of the throttle valve, the coupler fork rotates the indexing arm, which via the stop bolts rotates the wiper plate with the wiper. The wiper slides over the contact tracks, alternatingly contacting one transverse web belonging to one or the other contact track, and as a result tripping control pulses in the control electronics.

Because of the fixed coupling of the coupler and the throttle valve shaft, on the one hand, and the coupler and the wiper plate, on the other hand, all the radial and axial oscillations of the throttle valve shaft are transmitted to the wiper position. This can cause locally high wear on the contact tracks, particularly in the geometrically defined end positions. This wears away the contact track and/or wiper severely and causes functional problems.

OBJECT AND SUMMARY OF THE INVENTION

The rotary position transducer according to the invention has the advantage that because of the play-free spring coupling, all the axial and radial motions of the rotating device are compensated for. The spring coupling, which is highly elastic in the axial and radial directions, is embodied as torsionally rigid in the rotary direction, so that the transmission of rotational angle takes place with low hysteresis. Because the jittering of the rotary device transmitted to the wiper and contact track system is minimized, the service life of these components is maximized. At the same time, even axial and angular offsets of the axes of the rotary position transducer and rotary device can be compensated for by spring coupling.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
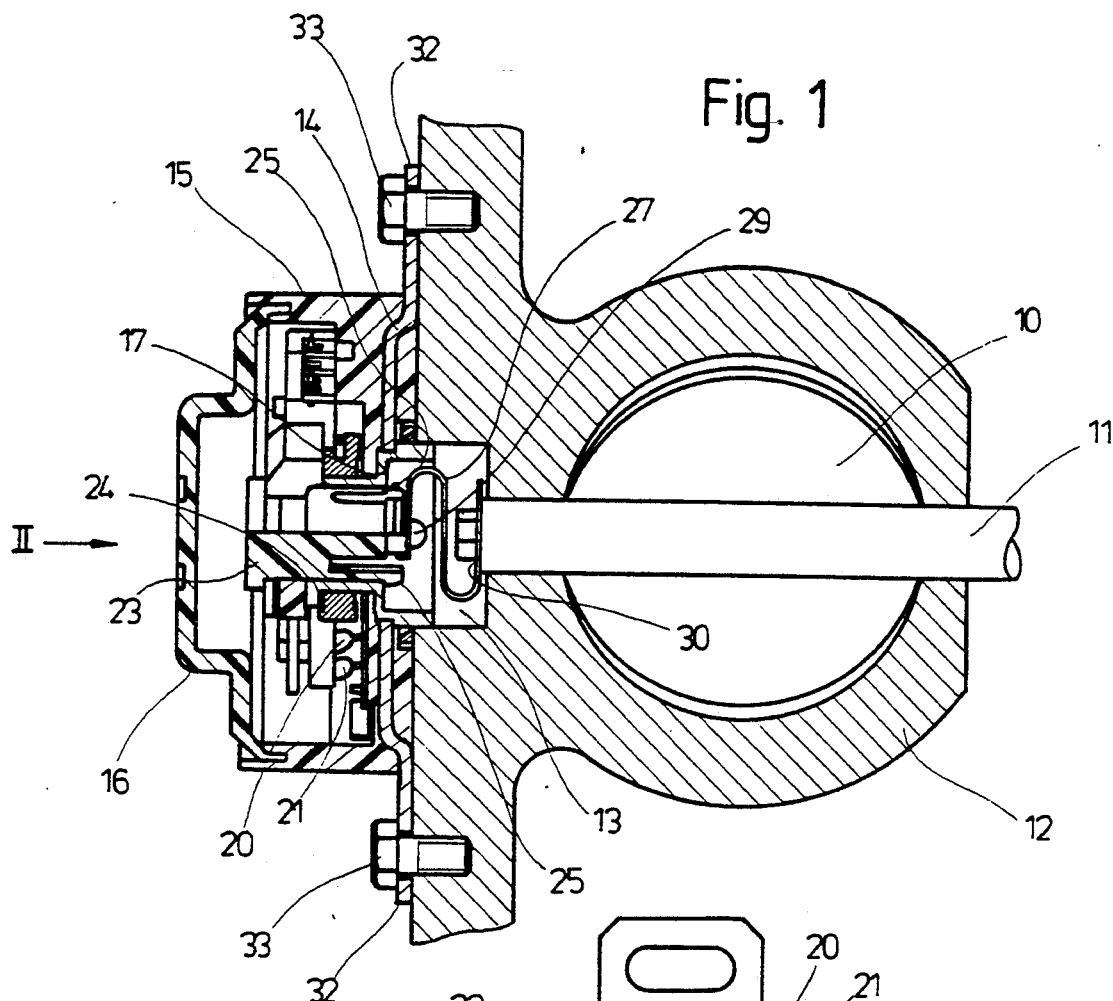
FIG. 1 is a longitudinal section through a rotary position transducer for a throttle valve in an internal combustion engine.
Figure 2:
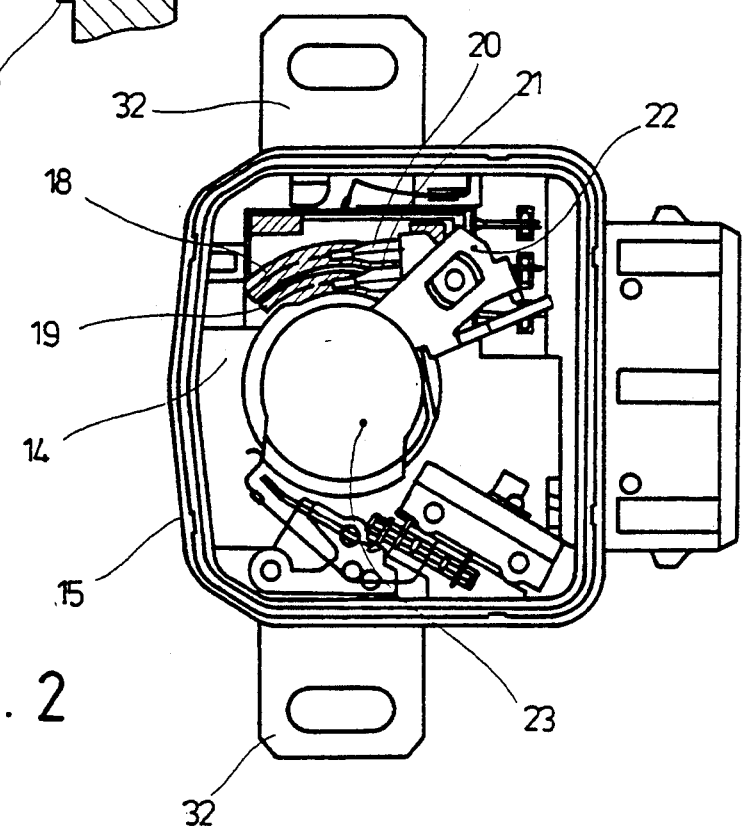
FIG. 2 is a view of the rotary position transducer in the direction of the arrow II in FIG. 1 with the housing cap removed.
Figure 3:
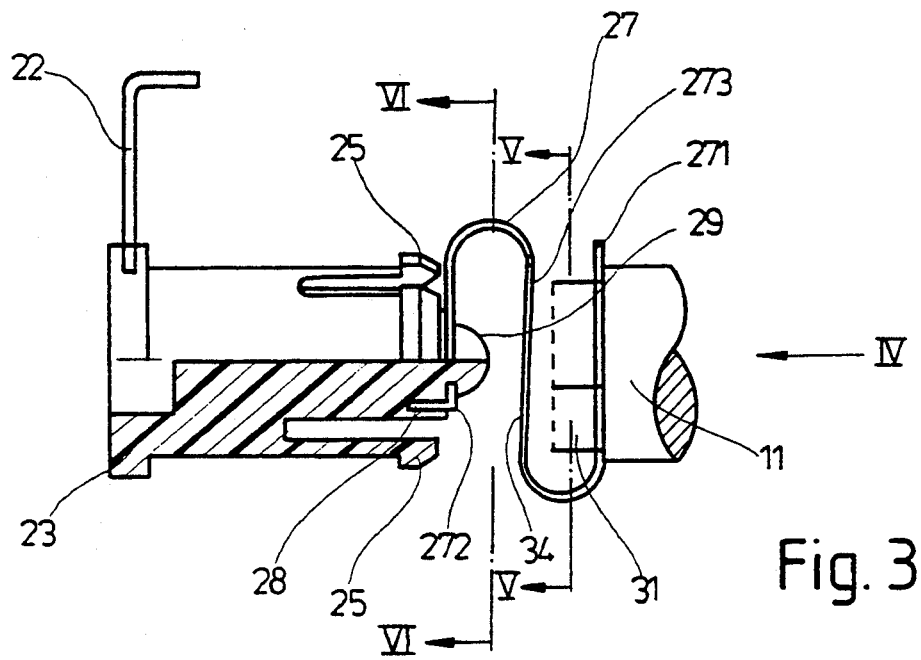
FIG. 3 is an enlarged view of a wiper carrier in the rotary position transducer of FIGS. 1 and 2.

The rotary position transducer shown in FIGS. 1 and 2, for generating a rotational angle signal dependent on the pivoted position of a throttle valve 10, which because of its additional switching functions is also known as a throttle valve switch, has a housing 15, held on a mounting plate 14 enclosed on its face end by a covering cap 16. By means of two straps 32 embodied o the mounting plate 14, the housing 15 is secured to the intake tube 12 of an internal combustion engine, the inside cross section of which tube is controlled by the throttle valve 10. To this end, the throttle valve 10 is mounted in a manner fixed against relative rotation on a throttle valve shaft 11 that is rotatably supported in the intake tube 12 and protrudes as far as the inside of the recess 13 in the wall of the intake tube 12. The recess 13 is covered by the mounting plate 14 and housing 15; in the region of the recess 13, the mounting plate 14 has a through opening 17.

Two contact tracks 18, 19 are disposed concentrically and in an electrically insulated manner on the mounting plate 14. Cooperating with the contact tracks 18, 19 are two wipers 20, 21, which are secured to the underside of a rotatably retained coupler 23 and rest with axial pressure on the contact tracks 18, 19. The coupler 22 is seated in a manner fixed against relative rotation on a bearing journal 23, which slidingly rests in a bearing bush 24 retained on the mounting plate 14. On its face end remote from the coupler 22, detent protrusions 25 are provided, distributed over the circumference, on the plastic bearing journal 23; with them, the bearing journal 23 grips the face end of the bearing bush 24 from behind. In the position of the rotary position transducer mounted on the intake tube 12, the bearing journal 23 protrudes into the recess 13 in the wall of the intake tube 12, where it is connected to the throttle valve shaft 11 via a spring coupling. The spring coupling 26 is torsionally rigid, but axially and radially it is highly elastic. In the rotary position transducer of FIGS. 1 and 2, this spring coupling is embodied by an S-shaped leaf spring 27.

Figure 4:
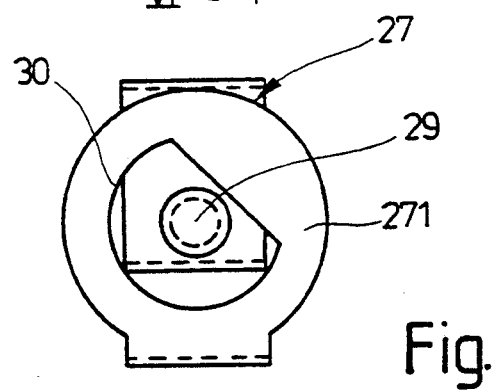
FIG. 4 is a view of the wiper carrier in the direction of the arrow IV in FIG. 3.
Figure 5:
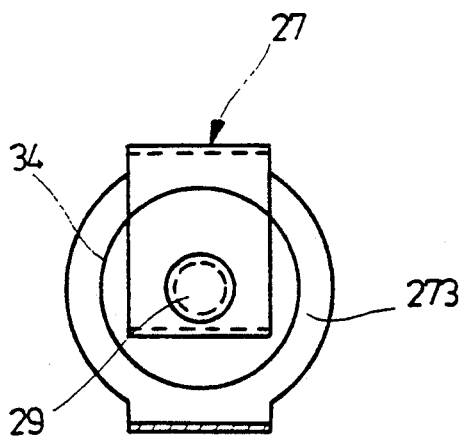
FIG. 5 is a section taken along the line V—V of FIG. 3.
Figure 6:
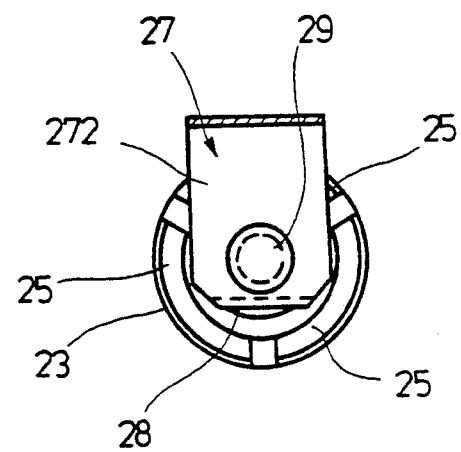
FIG. 6 is a section taken along the line VI—VI of FIG. 3.

A view of the bearing journal 23 and S-shaped leaf spring 27 on a larger scale is provided in FIGS. 3–6. As seen in FIGS. 4, 5 and 6, the leaf spring 27 has a circular shank 271 (FIG. 4), extending transverse to the axis of the throttle valve shaft 11 and bearing journal 23; a rectangular shank 272 (FIG. 6) extending parallel to the shank 271; and a circular middle part (FIG. 5) extending between and parallel to the two shanks 271, 275. The shank 271 in the middle part 273, on the one hand, and the middle part 273 and the shank 272, on the other, are each joined together by a rectangular elbow. The leaf spring 27 is fixed by one shank 272 on the face end of the bearing journal 23 and with its other shank 271 engages the end of the throttle valve shaft 11 protruding into the recess 13. Specifically, to this end the shank 272 of the leaf spring 27 that rests on the face end of the bearing journal 23 is bent at right angles in its last portion and inserted into an axial slit 28 beginning at the face end of the bearing journal 23. Additionally, the shank 272 is secured axially without play to the bearing journal 23 by means of a rivet 29. The fixation of the leaf spring 27 to the bearing journal 23 is shown in a plan view in FIG. 6. The fixation of the leaf spring 27 toward the throttle valve shaft is effected by means of a receiving opening 30 (FIG. 4), in the shank 271 of the leaf spring 27 resting on the face end of the throttle valve shaft 11. When the rotary position transducer is mounted, this receiving opening 30 can be slipped onto a corresponding shaped segment 31 on the free face end of the throttle valve shaft 11, so that the throttle valve shaft 11 and the leaf spring 27 are joined together form-fittingly and without play in the rotational direction.

Upon installation, first the bearing journal 23 with the coupler 22 secured to it is inserted into the bearing bush 24 until the detent protrusions 25 have locked into place behind the rim of the bearing bush 24. After that, the leaf spring 27 with its bent end on the shank 272 is inserted into the slit 28 in the bearing journal 23 and riveted at the face end of the bearing journal 23. Next, the housing 15 is closed with the covering cap 16, and the mounting plate 14 with the housing 15 is brought to its position on the wall of the intake tube 12; the receiving opening 30 is slipped form-fittingly onto the shaped portion 31 of the end of the throttle valve shaft 11 protruding into the recess 13 in the wall of the intake tube 12. Next, the mounting plate 14 is secured to the tube wall by its strap 32, by means of threaded screws 33. By means of the leaf spring 27, the bearing journal 23 is no pressed constantly against the rim of the bearing bush 24, even if the throttle valve shaft 11 is executing axial and radial motions. Now that the position of the bearing journal 23 is fixed, the position of the coupler 22 retained on the bearing journal 23 is fixed as well, and the wipers 20, 21 secured to the coupler 22 rest on the contact tracks 18, 19 with a constant pressing force. Axial and radial motions of the throttle valve shaft 11 are thus kept away from the wipers 20, 21 and contact tracks 18, 19.

To maintain the spring characteristic of the leaf spring when there are wide tolerances or a long axial stroke of the throttle valve shaft, a through opening 34 is provided in the middle part of the leaf spring 27, and its inside diameter is greater than the maximum diameter of the shaped portion 31 on the throttle valve shaft 11. This through opening 34 for the shaped portion 31 can be seen in plan view in FIG. 5.

Figure 7:
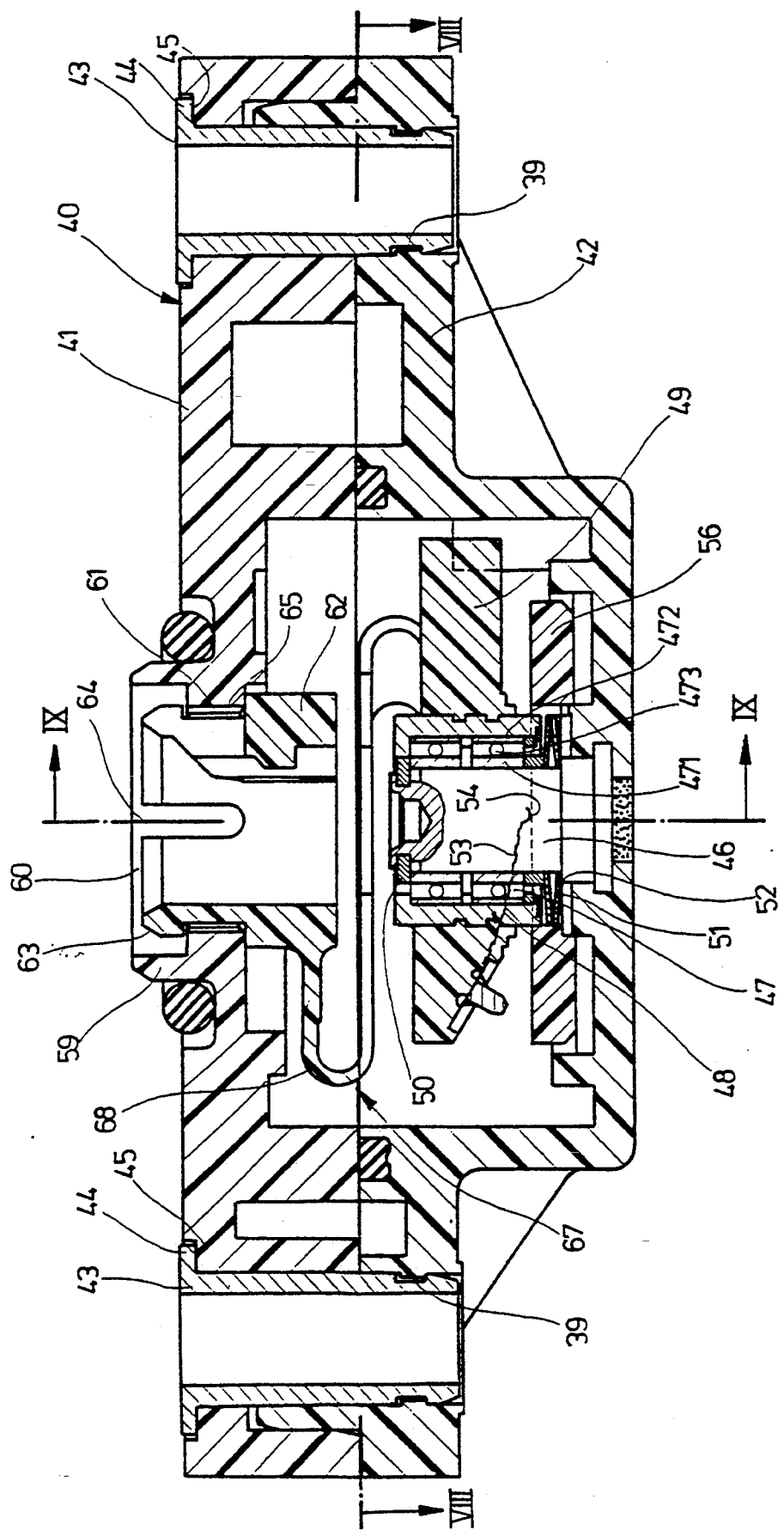
FIG. 7 is a longitudinal section through a rotary position transducer in a further exemplary embodiment, taken in the direction of the line VII—VII of FIG. 8.
Figure 8:
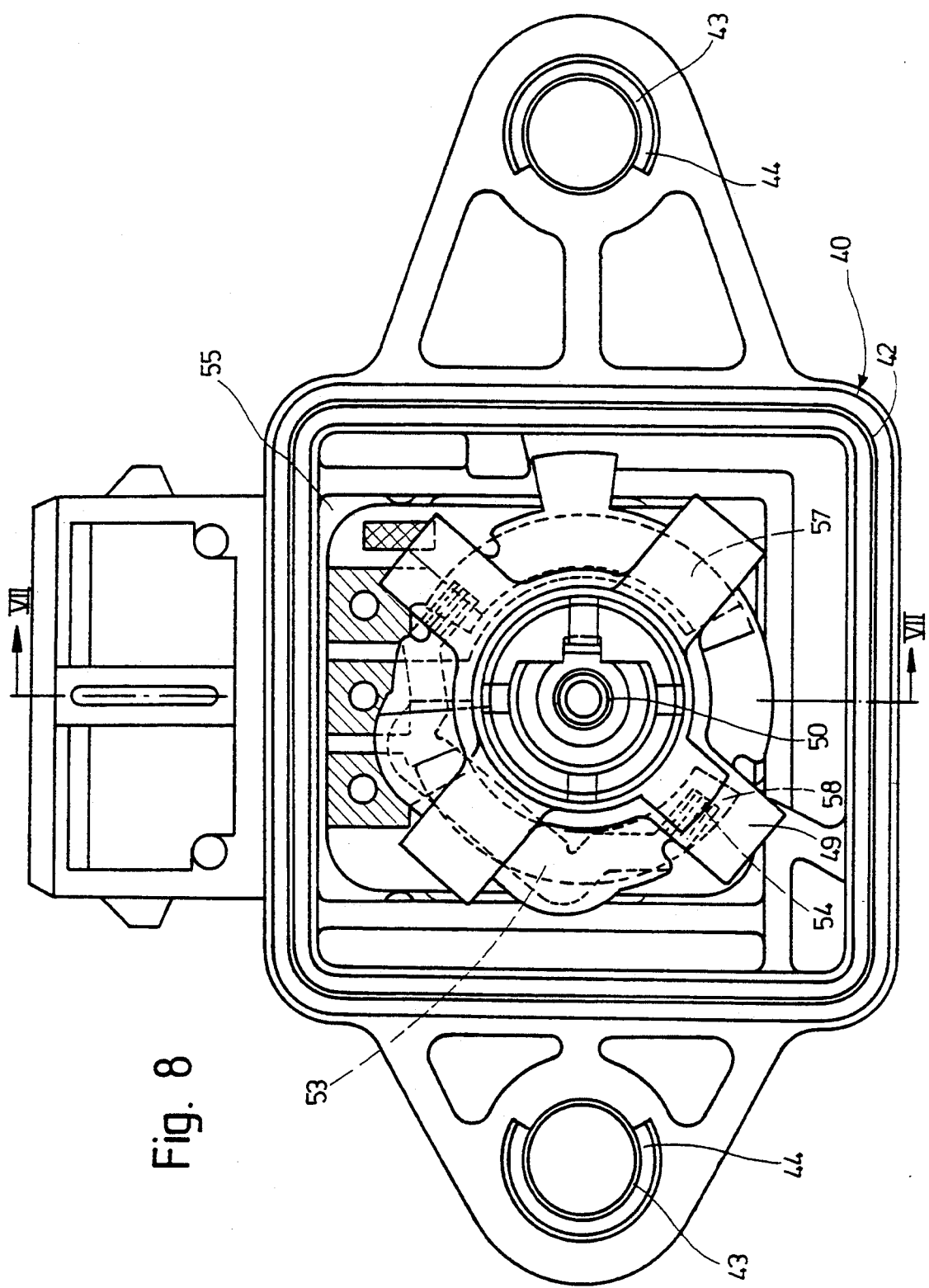
FIG. 8 is a section taken along the line VIII—VIII of FIG. 7.
Figure 9:
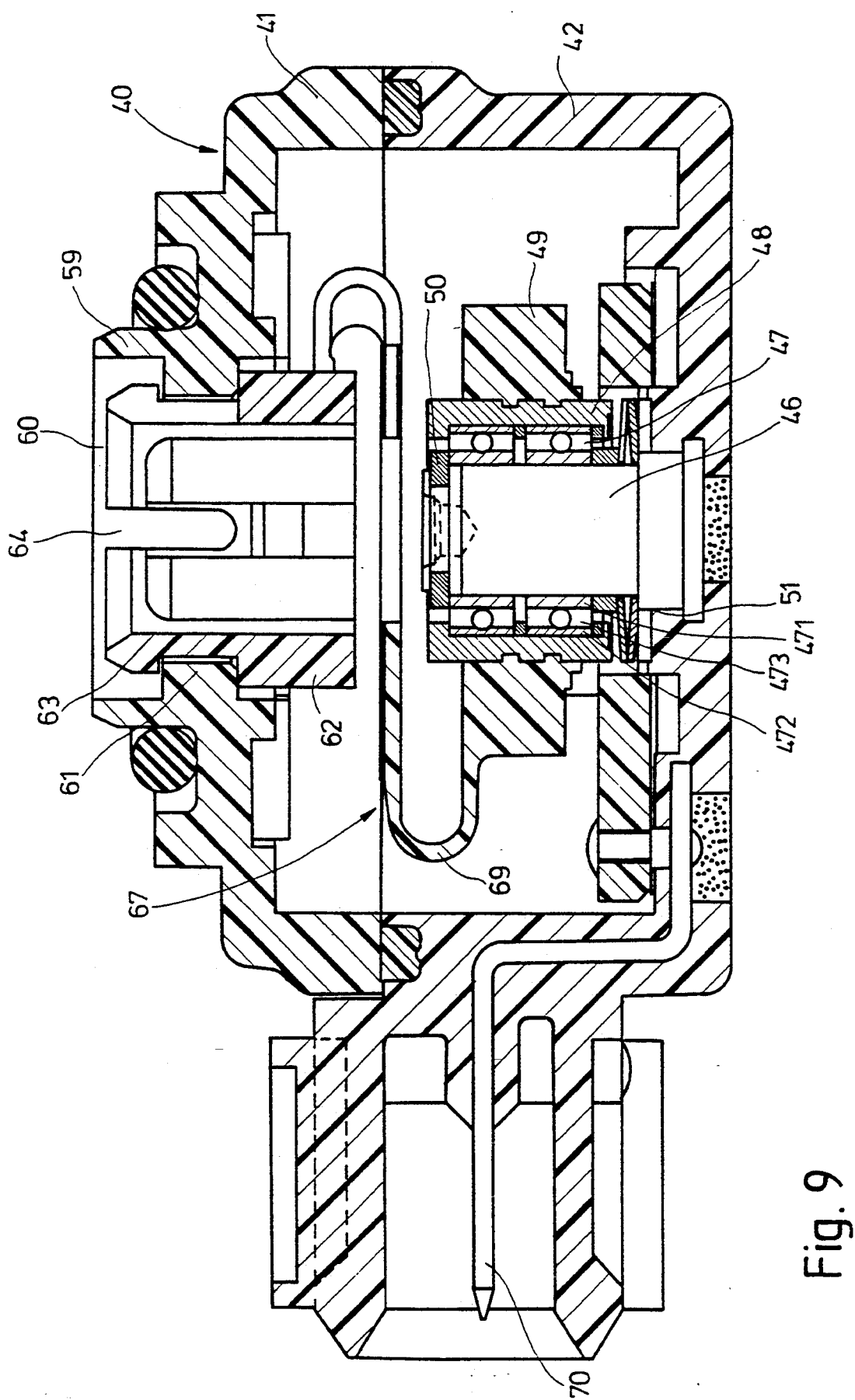
FIG. 9 is a section taken along the line IX—IX of FIG. 7.

FIGS. 7–9 show a further exemplary embodiment of a rotary position transducer for a throttle valve, in various views. The rotary position transducer or throttle valve transducer has a two-part plastic housing 40, with a first housing shell 41 and a second housing shell 42, which rest on one another by their open sides and are joined together by two detent sleeves 43. The detent sleeves 43 are passed through corresponding bores in the two housing shells 41, 42 and rest, with an annular flange 44, on an annular shoulder 45 in the first housing shell 41 and are locked into place on an annular radial protrusion 39 in the second housing shell 42. The fastening of the rotary position transducer to the engine intake tube is don with threaded screws, which are passed through the detent sleeves 43.

A bearing journal 46 that protrudes into the interior of the housing shell 42 is retained on the bottom of the second housing shell 42. Via a ball bearing 47 braced in the axial direction, a support cylinder 48 rests on the bearing journal 46, and a wiper plate 49 is secured without play to the support cylinder 48. In a known manner, the ball bearing 47 has an inner bearing race 471 seated on the bearing journal 46, an outer bearing race 472 firmly joined to the support cylinder 48, and balls 473 that roll along the bearing races 471, 472. A support disk 50 is retained without play on a hollow riveted connection on the free end of the bearing journal 46; the inner bearing race 471 is pressed against the support disk 50 by a cup spring 51, which in turn is supported between the other face end of the inner bearing race 471 and an annular protrusion 52 on the bearing journal 46. Secured to the wiper plate 49 is a wiper spring 53 having two wiper bridges 54, 55 (shown in dashed lines in FIG. 8), which rest with axial biasing force on two contact tracks 57, 58 disposed concentrically with the bearing journal 46 on a printed wiring board 56. The two contact tracks 57, 58 are diametrically opposite one another and take the form of arcs of a circle.

A housing connection piece 59, the hollow interior of which opens a housing opening 60, is formed in the housing shell 41 coaxially with the bearing journal 46. An annular collar 61 protrudes radially from the inner wall of the housing connection piece 59 and serves as a slide bearing for an insertion sleeve 62. For installation of the insertion sleeve 62, this sleeve is provided with a chamfer 63 on one face end and with slits 64 distributed over its circumference beginning at the face end. By means of the chamfer 63 and the slits 64 it is possible to pass the insertion sleeve 62 through the clear opening uncovered by the annular collar 61, until the annular collar locks into place in an outer annular groove 65 provided in the insertion sleeve 62. The insertion sleeve 62 serves to receive the end of a throttle valve shaft without play.

The insertion sleeve 62 and the wiper plate 49 are joined together by a spring coupling—which as in the exemplary embodiment of FIGS. 1 to 6—is torsionally rigid in the rotational direction and highly elastic axially and radially. The spring coupling is embodied here by a double-hoop cross coupling 67, which has two intersecting double hoops 68 (FIG. 7) and 69 (FIG. 9) extending transversely to the axes of the bearing journal 46 and insertion sleeve 62. Each approximately S-shaped double hoop 68, 69 is connected at one end to the insertion sleeve 62 and at the other to the wiper plate 49. The wiper plate 49, double hoop cross coupling 67 and insertion sleeve 62 are here embodied as an integral plastic injection-molded part. By means of the double hoop cross coupling 67, on the one hand any radial and axial play of the throttle valve shaft is kept away from the wiper plate 49, and on the other hand even a tolerance-dictated offset of the axes of the bearing journal 46 and insertion sleeve 62 is compensated for.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A rotary position transducer for generating electrical rotational angle signals as a function of a pivoted position of a rotary device in a fuel supply system of an internal combustion engine, said transducer comprising: at least one electrical contact track concentrically disposed on a first carrier and at least one wiper disposed on a second carrier, the wiper resting with axial pressure on the contact track, wherein one carrier is disposed as spatially stationary and the other is supported rotatably and has a securing member for coupling to the rotary device in a manner fixed against relative rotation and the securing member (30; 62) is connected to the rotatably supported carrier (23, 49) by means of a spring coupling (27; 67) that is torsionally rigid in the rotational direction and elastic in an axial and a radial direction and said spring coupling is embodied by an S-shaped leaf spring with shanks (271, 272) located parallel to one another and transversely to the axial direction.

2. A transducer as defined by claim 1, in which the carrier connected to the securing member (30) is embodied as a bearing journal (23) sliding in a bearing bush (24), the journal gripping the rim of the bearing bush toward the leaf spring (27) from behind with resilient detent protrusions (25).

3. A transducer as defined by claim 2, in which the bearing bush (24) is secured to a mounting plate (14) that forms the spatially stationary carrier.

4. A transducer as defined by claim 2, in which the bearing journal (23), on its face end oriented toward the leaf spring (27), has an axially extending slit (28), and that one shank (272) of the leaf spring (27) rests on the face end of the bearing journal (23) and on the one end is connected to it axially without play and on the other end protrudes into the slit (28) with an axially bent end portion.

5. A transducer as defined by claim 1, in which the securing member is embodied by a receiving opening (30) for the form-fitting reception of a corresponding shaped portion (31) on the rotary device, which opening is provided in the shank (271) of the leaf spring (27) remote from the bearing journal (23).

6. A transducer as defined by claim 1, in which the middle part (273) of the leaf spring (27) located between the two shanks (271, 272) of the leaf spring (27) and extending approximately parallel to them has a through opening (34) for the shaped portion (31) of the rotary device (10).

7. A rotary position transducer for generating electrical rotational angle signals as a function of a pivoted position of a rotary device in a fuel supply system of an internal combustion engine, said transducer comprising: at least one electrical contact track concentrically disposed on a first carrier and at least one wiper disposed on a second carrier, the wiper resting with axial pressure on the contact track, wherein one carrier is disposed as spatially stationary and the other is supported rotatably and has a securing member (62) for coupling to the rotary device in a manner fixed against relative rotation and the securing member (30; 62) is connected to the rotatably supported carrier (23, 49) by means of a spring coupling (27; 67) that is torsionally rigid in the rotational direction and elastic in an axial and a radial direction, and the spring coupling is embodied as two intersecting double hoops, the two intersecting double hoops (68, 69) of which, extending transversely to the axis of rotation, they are resilient in the axial and radial directions and are firmly joined on the one end to the rotatably supported carrier (49) and on another end to the securing member (62).

8. A transducer as defined by claim 7, in which each double hoop (68, 69) is approximately in the form of an S with two free hoop ends extending parallel to one another, which are connected to the rotatably supported carrier (49) and the securing element (62), preferably integrally.

9. A transducer as defined by claim 7, in which the rotatably supported carrier (49) is arranged to have low play and low friction on a bearing journal (46).

10. A transducer as defined by claim 9, in which the rotatably supported carrier (49) is seated in a manner fixed against relative rotation on a support cylinder (48) coaxially surrounding the bearing journal (46), and that an axially prestressed ball or roller bearing (47) is disposed between the support cylinder (48) and the bearing journal (46).

11. A transducer as defined by claim 10, in which a support shoulder (50) for the inner bearing race (471) of the ball or roller bearing (47) is disposed on the bearing journal (46), and that a cup spring (51) is supported between the face end of the inner bearing race (471) oriented away from the support shoulder (50) and a further support shoulder (52) on the bearing journal (46).

12. A transducer as defined by claim 9, in which the bearing journal (46) is secured to the spatially stationary carrier (40).

13. A transducer as defined by claim 7, in which the securing element is embodied as an insertion sleeve (62) for form-fittingly receiving shaft connected to the rotary device, and that the insertion sleeve (62) is retained on the spatially stationary carrier (40).

14. A transducer as defined by claim 12, in which the spatially stationary carrier is embodied as a two-part housing (40), the two housing shells (41, 42) of which rest on one another and are joined to one another, and that the bearing journal (46) is secured, protruding into the housing interior, in one housing shell (42), and the insertion sleeve (62) is rotatably disposed, coaxially with the bearing journal (46), in the other housing shell (41).

15. A transducer as defined by claim 13, in which the insertion sleeve (62) protrudes through a housing opening (60) in one housing shell (41) and has an annular groove (65), into which a sliding collar (61) radially protruding in the housing opening (60) protrudes.

16. A transducer as defined by claim 14, in which the insertion sleeve (62) has axial slits (64) beginning at its free face end and has a chamfer (63) on its free face end, the chamfer and the slits together enabling the insertion sleeve (62) to be inserted through the clear opening, uncovered by the sliding collar (61), of the housing opening (60).

17. A transducer as defined by claim 14, in which one housing shell (41), in the region of its housing opening (60), is formed out to make a housing connection piece (59), which completely encompasses the insertion sleeve (62).

18. A transducer as defined by claim 17, in which the carrier (49), the double hoop cross coupling (67) and an insertion sleeve (62) are embodied as one integral plastic injection-molded part.

19. A rotary position transducer for generating signals as a function of a rotary position of a rotary device, said transducer comprising at least one contact track disposed on a first carrier and at least one contact device disposed on a second carrier, the contact device resting with axial pressure on the contact track, said first carrier is free to rotate in a direction of rotation of said rotary device while the second carrier is stationary with respect to said rotary device, and a coupling device for flexibly coupling said rotary device to said first carrier wherein said coupling device is torsionally rigid in the rotational direction and elastic in an axial and radial direction and said spring coupling is embodied by an S-shaped leaf spring with shanks (271 272) located parallel to one another and transversely to the axial direction.

* * * * *